United States Patent
Moriwaki et al.

(10) Patent No.: US 6,813,647 B2
(45) Date of Patent: Nov. 2, 2004

(54) MICROCOMPUTER SYSTEM READING DATA FROM SECONDARY STORAGE MEDIUM WHEN RECEIVING UPPER ADDRESS FROM OUTSIDE AND WRITING DATA TO PRIMARY STORAGE MEDIUM

(75) Inventors: Shohei Moriwaki, Hyogo (JP); Yoshifumi Azekawa, Hyogo (JP); Osamu Chiba, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 120 days.

(21) Appl. No.: 10/327,048

(22) Filed: Dec. 24, 2002

(65) Prior Publication Data

US 2003/0140187 A1 Jul. 24, 2003

(30) Foreign Application Priority Data

Jan. 22, 2002 (JP) ........................................ 2002-012977

(51) Int. Cl.[7] ................................................ G06F 3/00
(52) U.S. Cl. ................................. 710/4; 710/36; 710/74
(58) Field of Search .............................. 710/3, 4, 5, 36, 710/38, 74

(56) References Cited

U.S. PATENT DOCUMENTS

| | | | | |
|---|---|---|---|---|
| 5,754,540 A | * | 5/1998 | Liu et al. ..................... | 370/315 |
| 5,920,698 A | * | 7/1999 | Ben-Michael et al. ...... | 709/224 |
| 6,269,098 B1 | * | 7/2001 | Crayford .................... | 370/389 |
| 6,701,406 B1 | * | 3/2004 | Chang et al. ............... | 710/310 |
| 2002/0138700 A1 | * | 9/2002 | Holmberg ................... | 711/137 |

OTHER PUBLICATIONS

Related U.S. patent application No. 10/310,829, filed Dec. 6, 2002 (Our Ref.: 57454–817).

* cited by examiner

Primary Examiner—Jeffrey Gaffin
Assistant Examiner—Alan Chen
(74) Attorney, Agent, or Firm—McDermott Will & Emery LLP (57) ABSTRACT

When a serial external interface receives a port address from a host device, a CPU reads data at all device addresses corresponding to the port address from a secondary storage medium and writes the data to a primary storage medium. When receiving a device address from host device, serial external interface transmits the data stored in primary storage medium and corresponding to the device address to host device. Therefore, it is possible to transmit the data to host device in short time after receiving the lowest address.

12 Claims, 6 Drawing Sheets

MICROCOMPUTER SYSTEM READING DATA FROM SECONDARY STORAGE MEDIUM WHEN RECEIVING UPPER ADDRESS FROM OUTSIDE AND WRITING DATA TO PRIMARY STORAGE MEDIUM

BACKGROUND OF THE INVENTION

1. Field of the Invention

The present invention relates to a microcomputer system reading data from a storage medium and outputting the data in response to a request from a host device, and particularly relates to a microcomputer system capable of outputting data to a host device at high rate.

2. Description of the Background Art

In recent years, various types of systems for reading data from a storage medium and outputting the data in response to a request from a host device have been developed, and one example thereof includes a system which employs an MDIO (Medium Dependent Input/Output) interface for LAN (Local Area Network).

Figure 1:
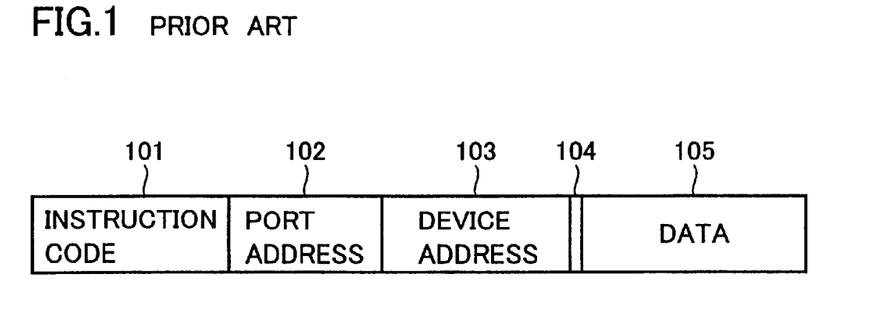
FIG. 1 is a view for explaining data transfer between a host device and an MDIO interface.

FIG. 1 is a view for explaining the data transfer between a host device and an MDIO interface. The host device is connected to a plurality of systems (which will be simply referred to as "systems" hereinafter) on which MDIO interfaces are mounted, respectively and different port addresses are allocated to the plural systems, respectively. In addition, a storage medium included in each system is divided into a plurality of regions each of several tens of words and different device addresses are allocated to the respective regions. The host device can select a system and a region of the storage medium included in the system and access a desired region by transmitting a port address and a device address.

If reading data from a system, the host device transmits an instruction code 101 indicating data read, a port address 102 and a device address 103 to the systems. Each system determines whether or not access from the host device is to the system while referring to the port address 102. If the host device accesses the system, the system refers to device address 103, reads data 105 from the region of the storage medium corresponding to device address 103, and transmits the read data to the host device. After transmitting device address 103, the host device is required to obtain data 105 before the passage of a turnaround time 104. This turnaround time 104 is normally specified to two cycles. If 2 MHz clock is used, for example, the system should return data 105 to the host device within 1 μs.

If the host device writes data to the storage medium in the system, the host device sequentially transmits instruction code 101 indicating data write, port address 102, device address 103 and data 105 and the system corresponding to port address 102 writes data 105 to the region of the storage medium corresponding to device address 103.

As described above, after the host device transmits device address 103, the system should return data 105 to the host device within turnaround time 104. Turnaround time 104 elapses if a microcomputer in the system reads data from the storage medium and transmits the read data to the host device after receiving device address 103. To realize data transfer within turnaround time 104, therefore, a special hardware has been disadvantageously required.

SUMMARY OF THE INVENTION

It is an object of the present invention to provide a microcomputer system capable of transmitting data at high rate in response to a data read request from a host device.

It is another object of the present invention to provide a microcomputer system capable of enhancing flexibility of a system.

According to one aspect of the present invention, a microcomputer system includes: a primary storage medium; a secondary storage medium larger in capacity than the primary storage medium; an interface transmitting and receiving data to and from an outside of the microcomputer system; and a processor reading data corresponding to a upper address from the secondary storage medium and writing the data to the primary storage medium when the interface receives the upper address from the outside of the microcomputer system, wherein when receiving a lower address from the outside of the microcomputer system, the interface transmits the data stored in the primary storage medium and corresponding to the lower address to the outside of the microcomputer system.

When receiving the lower address from the outside of the microcomputer system, the interface transmits data stored in the primary storage medium and corresponding to the lower address. It is, therefore, possible to transmit the data to the outside of the microcomputer system in short time after receiving the lowest address.

According to another aspect of the invention, a microcomputer system includes: a primary storage medium; an interface transmitting and receiving data to and from an outside of the microcomputer system; and a processor, wherein when the interface receives a upper address from the outside of the microcomputer system, the processor reads the data corresponding to the upper address from a secondary storage medium provided outside of the microcomputer system and writes the data to the primary storage medium, and when receiving a lower address from the outside of the microcomputer system, the interface transmits the data stored in the primary storage medium and corresponding to the lower address to the outside of the microcomputer system.

When receiving the lower address from the outside of the microcomputer system, the interface transmits data stored in the primary storage medium and corresponding to the lower address. It is, therefore, possible to transmit the data to the outside of the microcomputer system in short time after receiving the lowest address. In addition, since the secondary storage medium is provided outside of the microcomputer system, it is possible to determine the capacity and the access rate of the secondary storage medium in accordance with the system and to thereby improve the versatility of the microcomputer system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 2:
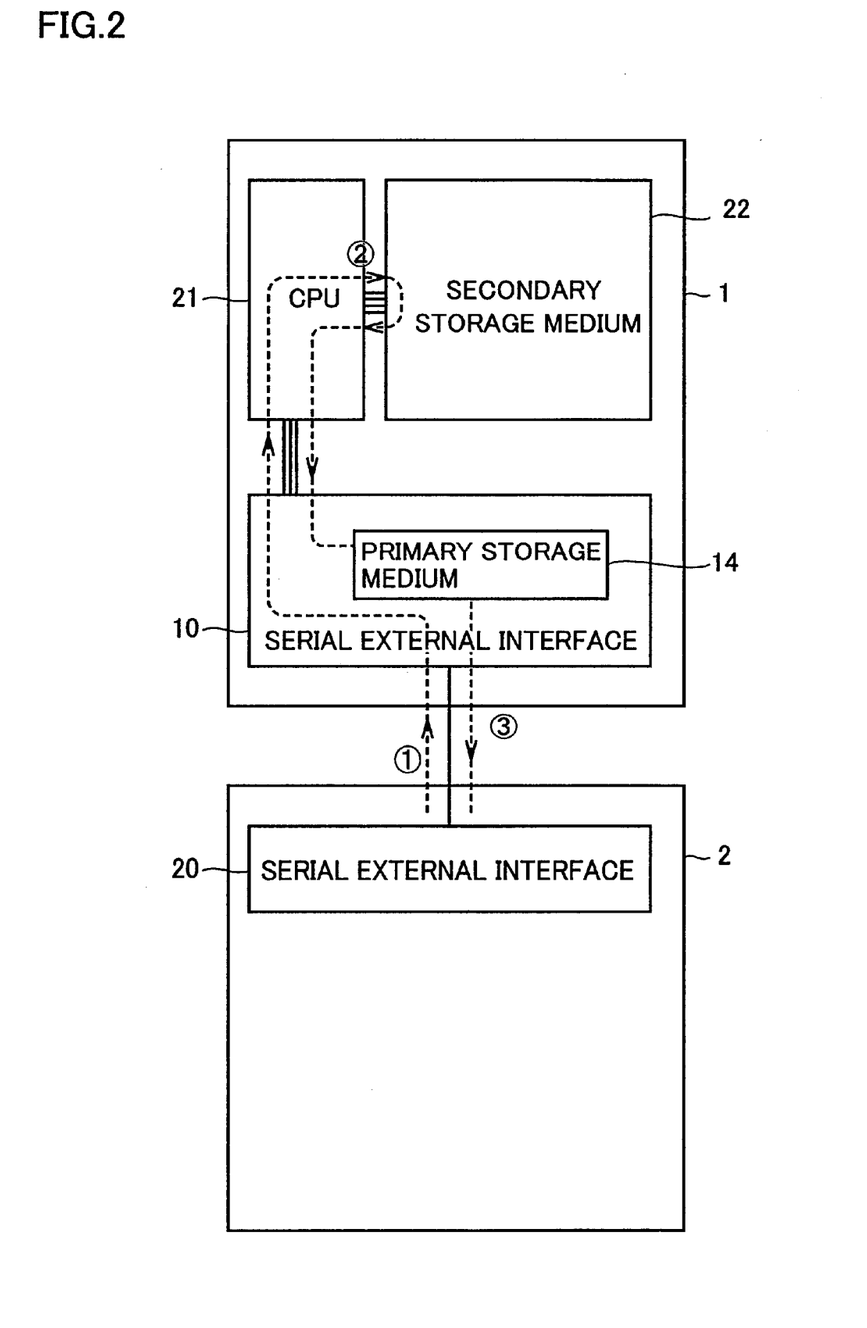
FIG. 2 is a block diagram showing a schematic configuration of a microcomputer system 1 according to the first embodiment of the present invention.

FIG. 2 is a block diagram showing the schematic configuration of a microcomputer system 1 according to the first embodiment of the present invention. This microcomputer system 1 includes a serial external interface 10 which transmits and receives data in serial to and from a serial external interface 20 in a host device 2, a CPU (Central Processing Unit) 21 which controls overall microcomputer system 1, and a large-capacity secondary storage medium 22. In addition, serial external interface 10 includes a primary storage medium 14 which temporarily stores data read from secondary storage medium 22 and which has high access rate. A dashed line shown in FIG. 2 indicates the flow of each information shown in FIG. 1, which will be described later in detail.

Primary storage medium 14 is constituted out of a high-rate accessible, small-capacity register, SRAM (Static Random Access Memory) or the like.

Secondary storage medium 22 is constituted out of a volatile memory such as a DRAM (Dynamic Random Access Memory) or an SRAM, or a nonvolatile memory such as a mask ROM (Read Only Memory) or a flash memory. If a rewritable nonvolatile memory such as a flash memory is employed, data can be held even if instantaneous power failure or the like occurs and data can be held even if power is turned off. It is, therefore, possible to restart microcomputer system 1 in a latest state when system 1 resumes by rewriting the data and updating the data to the latest data.

Further, if a volatile memory such as a DRAM or an SRAM is employed, the volatile memory is accessible at higher rate than that of the nonvolatile memory. Due to this, it is possible to transfer data from secondary storage medium 22 to primary storage medium 14 at high rate, which is advantageous to an interface having high clock frequency.

Figure 3:
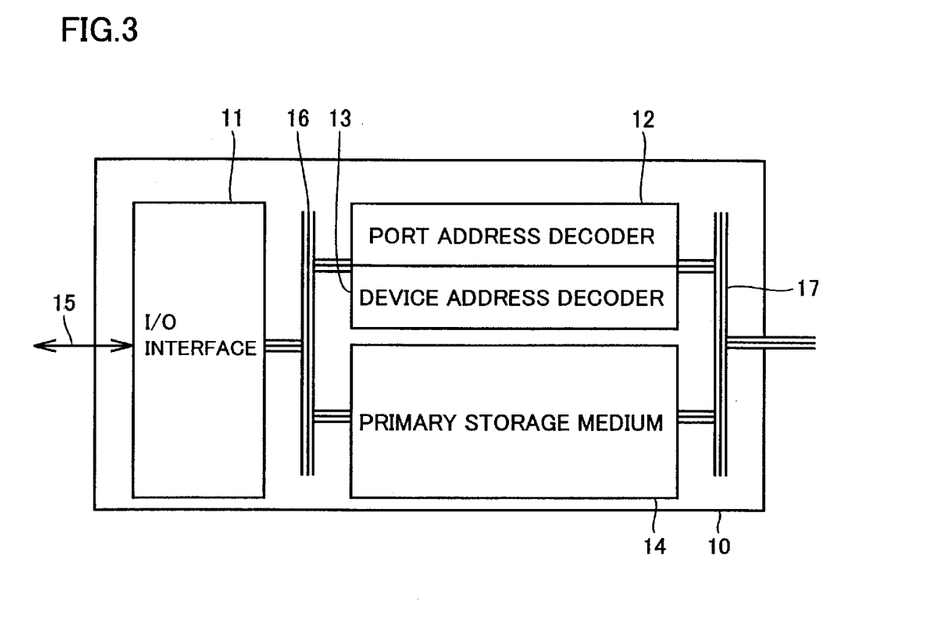
FIG. 3 is a block diagram showing a schematic configuration of a serial external interface 10 in microcomputer system 1 according to the first embodiment of the present invention.

FIG. 3 is a block diagram showing the schematic configuration of serial external interface 10 in microcomputer system 1. Serial external interface 10 incldues an I/O (Input/Output) interface 11 which converts serial data received from serial external interface 20 in host device 2 into parallel data, or which converts data read from primary storage medium 14 into serial data and transmits the serial data to serial external interface 20 in host device 2, a port address decoder 12 which decodes a port address received from I/O interface 11, a device address decoder 13 which decodes a device address received from I/O interface 11, and primary storage medium 14.

When receiving instruction code 101 from host device 2, I/O interface 11 decodes instruction code 101 and outputs the decoding result of instruction code 101 to CPU 21. When receiving port address 102 from host device 2, I/O interface 11 outputs port address 102 to port address decoder 12 through an internal bus 16. Port address decoder 12 decodes port address 102 and outputs the decoding result of port address 102 to CPU 21 through an internal bus 17. In addition, when receiving device address 103 from host device 2, I/O interface 11 outputs device address 103 to device address decoder 13 through internal bus 16. Device address decoder 13 decodes device address 103 and outputs the decoding result of device address 103 to primary storage medium 14 through internal bus 17.

Figure 4:
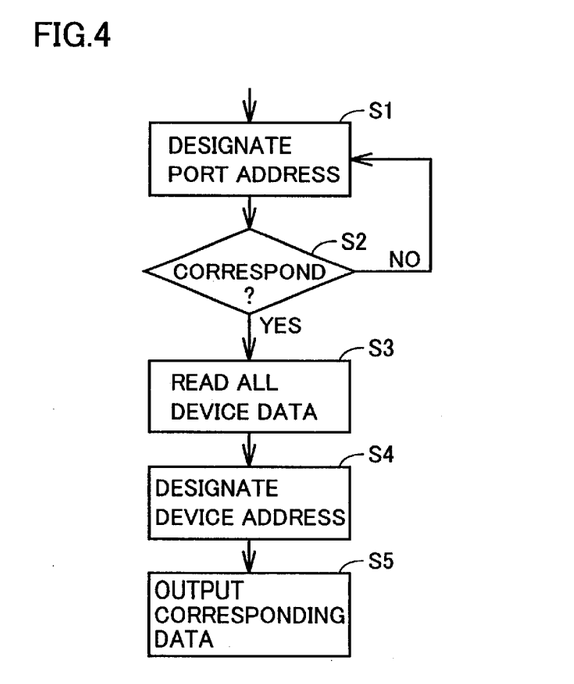
FIG. 4 is a flow chart for explaining processing procedures of the microcomputer system according to the first embodiment of the present invention.

FIG. 4 is a flow chart for explaining the processing procedures of microcomputer system 1 according to the first embodiment according of the present invention. This flow chart shows processing procedures when host device 2 reads data from secondary storage medium 12 in microcomputer system 1. When receiving instruction code 101 indicating data read from host device 2, I/O interface 11 receives port address 102 following instruction code 101 and outputs received port address 102 to port address decoder 12 (in a step S1).

Port address decoder 12 decodes port address 102 received from I/O interface 11 and, as indicated by ①  shown in FIG. 2, outputs the decoding result of port address 102 to CPU 21. CPU 21 determines whether or not the decoding result received from port address decoder 12 corresponds to secondary storage medium 22 (in a step S2). If the decoding result does not correspond to secondary storage medium 22 ("No" in step S2), processing returns to step S1 and I/O interface 11 waits for the designation of port address 102 again.

If the decoding result corresponds to secondary storage medium 22 ("Yes" in step S2), CPU 21 reads data at all device addresses corresponding to port address 102 from secondary storage medium 22 and writes the data to primary storage medium 14 through internal bus 17 as indicated by ② shown in FIG. 2 (in a step S3). When receiving device address 103 following port address 102, I/O interface 11 outputs device address 103 to device address decoder 13 (in a step S4). Device address decoder 13 decodes device address 103, outputs the decoding result of device address 103 to primary storage medium 14, and, as indicated by ③ shown in FIG. 2, allows primary storage medium 14 to output data corresponding to device address 103 (in a step S5). I/O interface 11 converts the data received from primary storage medium 14 into serial data and transmits the serial data to host device 2 through a serial bus 15.

In the above description, port address decoder 12 decodes port address 102, and CPU 21 reads data at all device addresses corresponding to port address 102 from secondary storage medium 22 in accordance with the decoding result of port address 102 and writes the data to primary storage medium 14. Alternatively, port address decoder 12 may decode port address 102, device address decoder 13 may decode the upper address of device address 103, and CPU 21 may read all data corresponding to port address 102 and the upper address of device address 103 from secondary storage medium 22 in accordance with the decoding results of port address 102 and the upper address of device address 103 and write the data to primary storage medium 14. In this case, device address decoder 13 outputs the decoding result of the lower address of device address 103 to primary storage medium 14 and allows primary storage medium 14 to output data corresponding to the lower address of device address 103.

Further, a case of providing two address structures of port address 102 and device address 103 has been described in this embodiment. Even with three or more address structures, it is also possible to realize a microcomputer system in the same manner as that described herein. As can be seen, by elaborating the address hierarchical structure, it is possible to reduce the capacity of primary storage medium 14 and to reduce consumption power and circuit scale.

As described above, according to the microcomputer system in the first embodiment, when the upper address (port address 102) of secondary storage medium 22 is defined, data at all the corresponding device addresses is read from secondary storage medium 22 and written to primary storage medium 14. When the lower address (device address 103) of secondary storage medium 22 is defined, corresponding data is read from primary storage medium 14 and transmitted to host device 2. It is, therefore, possible to transmit the corresponding data to host device 2 within about one cycle after receiving the lowest address. As a result, even with the software processing of CPU 21, it is possible to return designated data to host device 2 within turnaround time.

Moreover, since the microcomputer system including the CPU can be constituted out of one chip, it is possible to realize the interface at low cost. In addition, since the microcomputer system includes the CPU, it is also possible to include the other peripheral circuits controlled by the CPU in the same chip and to thereby construct a system excellent in expandability and flexibility. Besides, by changing a program executed by the CPU, it is possible to realize an interface conformable to each standard.

(Second Embodiment)

Figure 5:
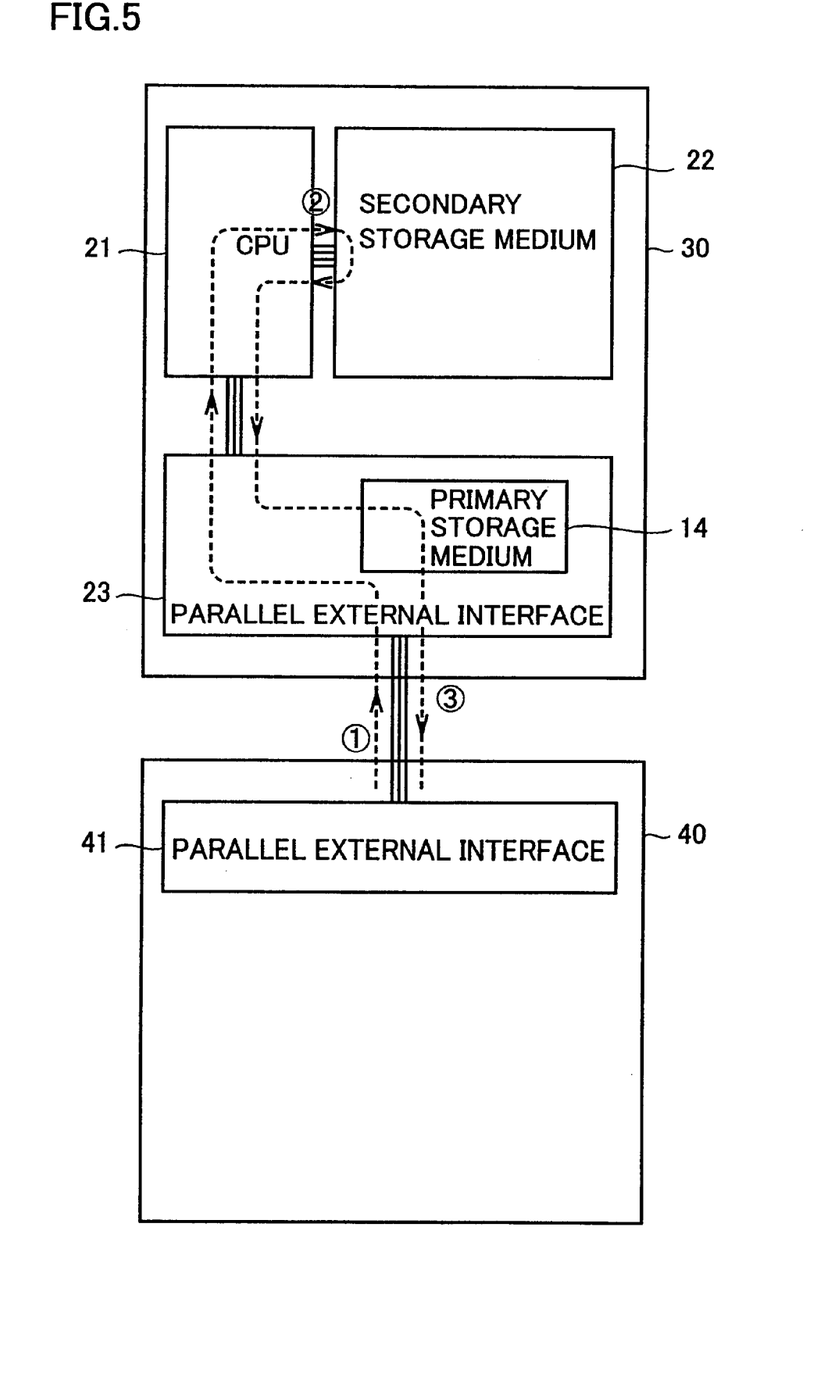
FIG. 5 is a block diagram showing a schematic configuration of a microcomputer system according to the second embodiment of the present invention.

FIG. 5 is a block diagram showing the schematic configuration of a microcomputer system according to the second embodiment of the present invention. This microcomputer system 30 includes a parallel external interface 23 which transmits and receives data in parallel to and from a parallel external interface 41 in a host device 40, a CPU 21 which controls overall microcomputer system 30, and a large-capacity secondary storage medium 22. In addition, parallel external interface 23 includes a primary storage medium 14 which temporarily stores data read from secondary storage medium 22 and which has high access rate.

Microcomputer system 30 in this embodiment differs from microcomputer system 1 in the first embodiment shown in FIG. 1 only in that the data transfer between microcomputer system 30 and host device 40 is performed in parallel. Therefore, the same constituent elements and functions will not be repeatedly described herein in detail.

When receiving instruction code 101 indicating data read from host device 40, parallel external interface 23 receives and decodes port address 102 following instruction code 101. Thereafter, as indicated by ① shown in FIG. 5, parallel external interface 23 outputs the decoding result of port address 102 to CPU 21. If the decoding result received from parallel external interface 23 corresponds to secondary storage medium 22, CPU 21 reads data at all device addresses corresponding to port address 102 from secondary storage medium 22 and writes the data to primary storage medium 14 as indicated by ② shown in FIG. 5.

When receiving device address 103 following port address 102, parallel external interface 23 decodes device address 103, outputs the decoding result of device address 103 to primary storage medium 14 and, as indicated by ③ shown in FIG. 5, allows primary storage medium 14 to output data corresponding to device address 103. Parallel external interface 23 transmits data received from primary storage medium 14 as parallel data to host device 40.

As described above, according to the microcomputer system in the second embodiment, the data transfer between microcomputer system 30 and host device 40 is performed in parallel. It is, therefore, possible to not only obtain the advantages described in the first embodiment but also reduce time required to transfer data.

(Third Embodiment)

Figure 6:
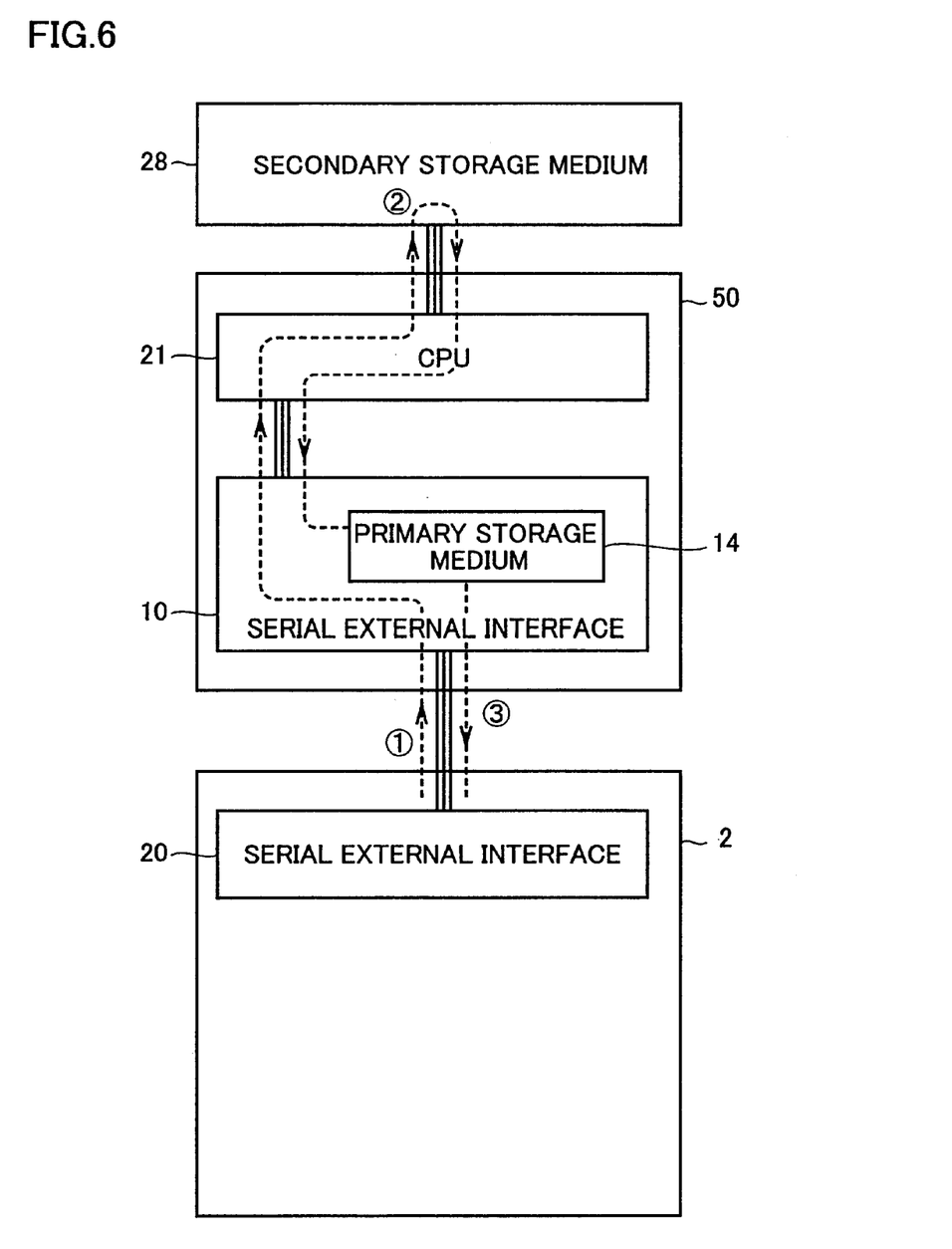
FIG. 6 is a block diagram showing a schematic configuration of a microcomputer system according to the third embodiment of the present invention.

FIG. 6 is a block diagram showing the schematic configuration of a microcomputer system according to the third embodiment of the present invention. This microcomputer system 50 includes serial external interface 10 which transmits and receives data in serial to and from serial external interface 20 in host device 2, and CPU 21 which controls overall microcomputer system 50. In addition, serial external interface 10 includes primary storage medium 14 which temporarily stores data read from a secondary storage medium 28 provided outside of microcomputer system 50 and which has high access rate.

Microcomputer system 50 in this embodiment differs from microcomputer system 1 in the first embodiment shown in FIG. 2 only in that secondary storage medium 28 is provided outside of microcomputer system 50. Therefore, the same constituent elements and functions will not be repeatedly described herein in detail.

Secondary storage medium 28 which is provided outside of microcomputer system 50, is constituted out of a volatile memory such as a DRAM or an SRAM, or a nonvolatile memory such as a mask ROM or a flash memory. If a rewritable nonvolatile memory such as a flash memory is employed, data can be held even if instantaneous power failure or the like occurs and data can be held even if power is turned off. It is, therefore, possible to restart the microcomputer system in a latest state when the system resumes by rewriting the data and updating the data to the latest data.

Further, if a volatile memory such as a DRAM or an SRAM is employed, the volatile memory is accessible at higher rate than that of the nonvolatile memory. Due to this, it is possible to transfer data from secondary storage medium 28 to primary storage medium 14 at high rate, which is advantageous to an interface having high clock frequency.

When receiving instruction code 101 indicating data read from host device 2, serial external interface 10 receives and decodes port address 102 following instruction code 101. Then, as indicated by ① shown in FIG. 6, serial external interface 10 outputs the decoding result of port address 102 to CPU 21. If the decoding result received from serial external interface 10 corresponds to secondary storage medium 28, CPU 21 reads data at all device addresses corresponding to port address 102 from secondary storage medium 28 provided outside of microcomputer system 50 and writes the data to primary storage medium 14, as indicated by ② shown in FIG. 6.

When receiving device address 103 following port address 102, serial external interface 10 decodes device address 103, outputs the decoding result of device address 103 to primary storage medium 14 and, as indicated by ③ shown in FIG. 6, allows primary storage medium 14 to output data corresponding to device address 103. Serial external interface 10 converts the data received from primary storage medium 14 into serial data and transmits the serial data to host device 2.

As described above, according to the microcomputer system in the third embodiment, secondary storage medium 28 is provided outside of microcomputer system 50. It is, therefore, possible to not only obtain the advantages described in the first embodiment but also connect a storage medium of arbitrary capacity and arbitrary access rate to microcomputer system 50 and to thereby improve the versatility of the microcomputer system.

(Fourth Embodiment)

Figure 7:
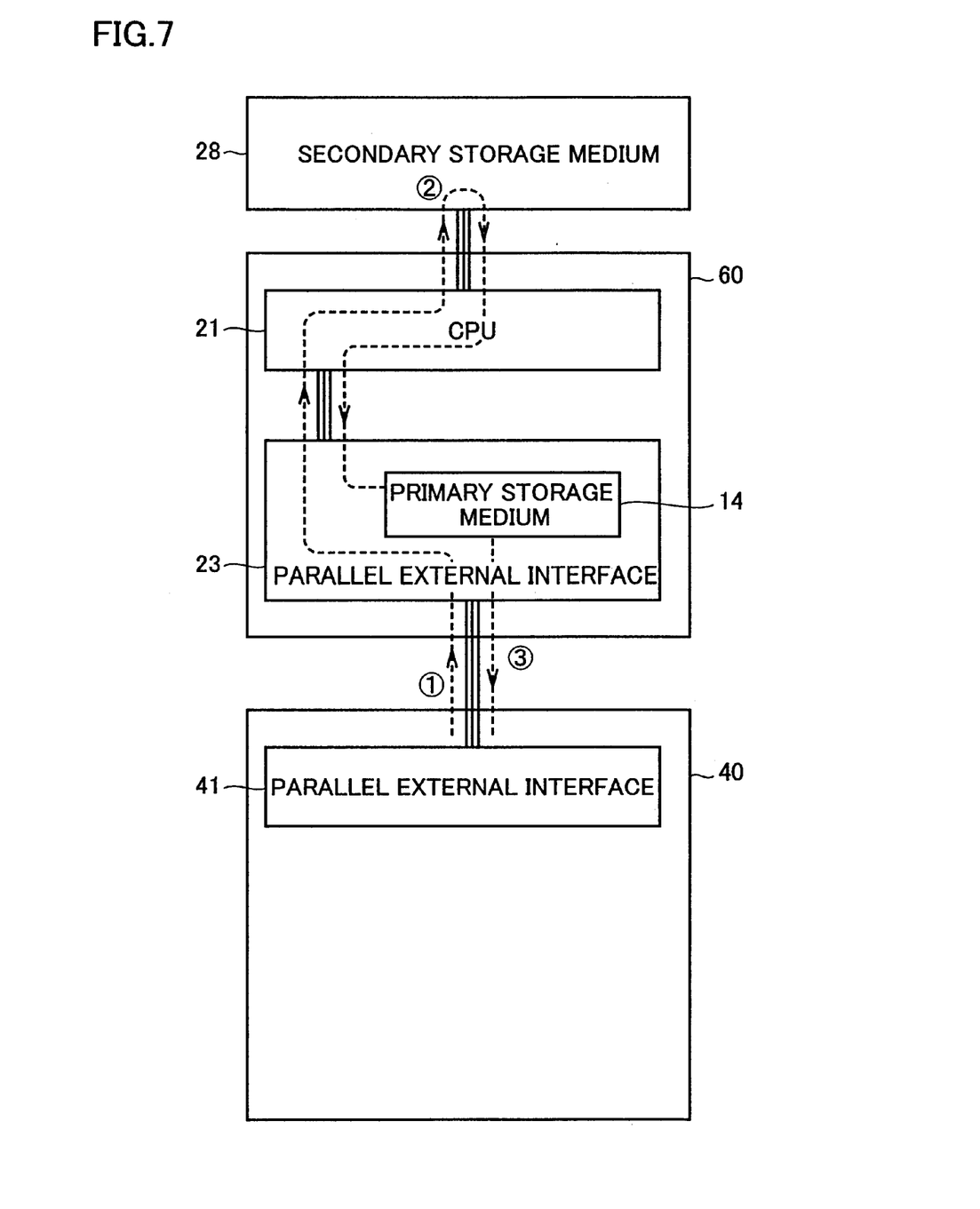
FIG. 7 is a block diagram showing a schematic configuration of a microcomputer system according to the fourth embodiment of the present invention.

FIG. 7 is a block diagram showing the schematic configuration of a microcomputer system according to the fourth embodiment of the present invention. This microcomputer system 60 includes parallel external interface 23 which transmits and receives data in parallel to and from parallel external interface 41 in host device 40, and CPU 21 which controls overall microcomputer system 60. In addition, parallel external interface 23 includes primary storage medium 14 which temporarily stores data read from secondary storage medium 28 provided outside of microcomputer system 28 and which has high access rate.

Microcomputer system 60 in this embodiment differs from microcomputer system 50 in the third embodiment shown in FIG. 6 only in that the data transfer between microcomputer system 60 and host device 40 is performed in parallel. Therefore, the same constituent elements and functions will not be repeatedly described herein in detail.

When receiving instruction code 101 indicating data read from host device 40, parallel external interface 23 receives and decodes port address 102 following instruction code 101. Then, as indicated by ① shown in FIG. 7, parallel external interface 23 outputs the decoding result of port address 102 to CPU 21. If the decoding result received from parallel external interface 23 corresponds to secondary storage medium 28, CPU 21 reads data at all device addresses corresponding to port address 102 from secondary storage medium 28 provided outside of microcomputer system 60 and writes the data to primary storage medium, as indicated by ② shown in FIG. 7.

When receiving device address 103 following port address 102, parallel external interface 23 decodes device address 103, outputs the decoding result of device address 103 to primary storage medium 14 and, as indicated by ③ show in FIG. 7, allows primary storage medium 14 to output data corresponding to device address 103. Parallel external interface 23 transmits the data received from primary storage medium 14 to host device 40 as parallel data.

As described above, according to the microcomputer system in the fourth embodiment, the data transfer between microcomputer system 60 and host device 40 is performed in parallel. It is, therefore, possible to not only obtain the advantages described in the third embodiment but also reduce time required to transfer data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microcomputer system comprising:
    a primary storage medium;
    a secondary storage medium larger in capacity than said primary storage medium;
    an interface transmitting and receiving data to and from an outside of the microcomputer system; and
    a processor reading data corresponding to a upper address from said secondary storage medium and writing the data to said primary storage medium when said interface receives said upper address from the outside of the microcomputer system, wherein
    when receiving a lower address from the outside of the microcomputer system, said interface transmits the data stored in said primary storage medium and corresponding to said lower address to the outside of the microcomputer system.

2. The microcomputer system according to claim 1, wherein
    said interface transmits and receives the data in serial to and from the outside of the microcomputer system.

3. The microcomputer system according to claim 1, wherein
    said interface transmits and receives the data in parallel to and from the outside of the microcomputer system.

4. The microcomputer system according to claim 1, wherein
    said interface includes:
    a port address decoder decoding a port address received from the outside of the microcomputer system, and outputting a decoding result to said processor; and
    a device address decoder decoding a device address received from the outside of the microcomputer system, and outputting a decoding result to said primary storage medium.

5. The microcomputer system according to claim 1, wherein
    said primary storage medium is constituted out of a high-rate accessible, small-capacity register, and
    said secondary storage medium is constituted out of a large-capacity nonvolatile memory lower in access rate than said primary storage medium.

6. The microcomputer system according to claim 1, wherein
    said primary storage medium is constituted out of a high-rate accessible, small-capacity register, and
    said secondary storage medium is constituted out of a large-capacity volatile memory lower in access rate than said primary storage medium.

7. A microcomputer system comprising:
    a primary storage medium;
    an interface transmitting and receiving data to and from an outside of the microcomputer system; and
    a processor, wherein
    when said interface receives a upper address from the outside of the microcomputer system, said processor reads data corresponding to said upper address from a secondary storage medium provided outside of said microcomputer system and writes the data to said primary storage medium, and
    when receiving a lower address from the outside of the microcomputer system, said interface transmits the data stored in said primary storage medium and corresponding to said lower address to the outside of the microcomputer system.

8. The microcomputer system according to claim 7, wherein
    said interface transmits and receives the data in serial to and from the outside of the microcomputer system.

9. The microcomputer system according to claim 7, wherein
    said interface transmits and receives the data in parallel to and from the outside of the microcomputer system.

10. The microcomputer system according to claim 7, wherein
    said interface includes:
    a port address decoder decoding a port address received from the outside of the microcomputer system, and outputting a decoding result to said processor; and
    a device address decoder decoding a device address received from the outside of the microcomputer system, and outputting a decoding result to said primary storage medium.

11. The microcomputer system according to claim 7, wherein said primary storage medium is constituted out of a high-rate accessible, small-capacity register, and said secondary storage medium is constituted out of a large-capacity nonvolatile memory lower in access rate than said primary storage medium.

12. The microcomputer system according to claim 7, wherein said primary storage medium is constituted out of a high-rate accessible, small-capacity register, and said secondary storage medium is constituted out of a large-capacity volatile memory lower in access rate than said primary storage medium.

* * * * *